UNITED STATES PATENT OFFICE.

AUGUST SARTORIUS, OF NEW YORK, N. Y.

MOIST COLORS.

SPECIFICATION forming part of Letters Patent No. 574,220, dated December 29, 1896.

Application filed March 21, 1896. Serial No. 584,321. (No specimens.)

*To all whom it may concern:*

Be it known that I, AUGUST SARTORIUS, of New York city, in the county and State of New York, have invented new and useful Improvements in Moist Colors, of which the following is a full, clear, and exact description.

The invention relates to moist colors to be used in water-color style and gouache style, and has for its objects to provide colors which may be readily applied in a uniform manner, which will dry quickly, yet permit of blending or even applying one color on top of another before fully dry, and which when dried will not leave a glossy shining surface, such as is produced by the application of oil-colors.

The invention will be fully described hereinafter and the features of novelty pointed out in the appended claims.

In carrying out the invention I employ the coloring-matter proper in the shape of powder, as is customary in the manufacture of liquid colors. As a binding and dissolving medium I employ a mixture of the following constitution: one thousand six hundred and twenty grams of soft soap, one gallon of mucilage, one-half pint of oil of mirbane, one-half pound of salicylic acid, three pints of glycerin, and one to two pints of water. These ingredients are mixed cold, and the liquid is left standing a few days, but stirred from time to time to facilitate the solution of the ingredients. The liquid is then passed through a paint-mill to squeeze out any lumps and produce a homogeneous liquid. This liquid is then put into a bowl and mixed with the powdered color until the mass has acquired a sufficient consistency, after which it is run through a paint-mill. The proportion of the color and liquid varies according to the nature of the color. It may be said that on an average I employ one and one-half pounds of color to each pint of liquid. For some colors, however, the proportions are very much different from this average.

Of the ingredients named soft soap, mucilage, and salicylic acid are the most important ones. The other ingredients assist in making the colors convenient for use, as will be understood from the statement of the functions to be made presently. The soap used makes the color come out of the brush readily, so that the canvas or other surfaces will be readily covered. The mucilage binds the color and makes it sticky to a certain extent. The mirbane-oil gives the colors a more desirable odor and may be omitted altogether. The action of the glycerin consists in keeping the applied colors moist for the requisite time to enable the artist to properly blend the colors, and water is used to thin the color, so that it will be readily taken up by and applied with a brush. Salicylic acid is used to give the color more permanency and to prevent it from getting moldy. This ingredient is of great importance in the improved colors.

The colors are applied in the ordinary water-color style or gouache style on any material, such as canvas, cardboard, paper, silk, wood, &c., no preparation of the material being required before the colors are applied. The effects of pastel-painting can also be readily obtained with the colors. They cannot spread on cloth, silk, or metal. The colors are readily applied and the surfaces can be effectively covered with great ease, there being no danger of the color running together in drops or streaks unless thinned too much. When it is desired to use the colors for coloring photographs having a smooth surface, the photographs should first be covered with an exceedingly thin coat of glycerin, which is gently rubbed on with the finger.

The appearance of the colors is mat, being similar in this respect to the ordinary water-colors and gouache colors, but they have also a velvety appearance, which enables the artist to produce pastel effects. On account of these properties of the colors, paintings executed therewith can be readily reproduced by photography, as all irregular reflections, which are so troublesome in paintings executed with shining colors, are entirely avoided. One of the great advantages of the colors is that they dry very quickly on any kind of material, and yet their blending properties are equal to those of the colors used hitherto. No oil, turpentine, or the like is required, the colors being simply diluted with water whenever necessary. The finished paintings are practically permanent, adhere firmly to the canvas, paper, &c., and are not apt to crack or peel off.

If artist's canvas prepared with an oil preparation is painted over with the white made according to my invention, an absorbent canvas for the application of oil-colors would be obtained, so a mat effect can be produced in the oil-colors also.

The colors may also be applied in the style of oil-colors, and after being varnished will produce the exact appearance of oil-paintings.

It will be understood that I do not restrict myself to the exact proportions of the ingredients hereinabove stated, but the same results may be obtained with greater or less perfection by varying the proportions within certain limits.

I desire to call special attention to the large proportion of soap used; also, the colors do not contain any substances that require the application of heat for amalgamation.

Having thus described my invention, I claim as new and desire to secure by Letters Patent—

1. Moist colors whose chief ingredients are soft soap, mucilage and salicylic acid in about the proportions specified.

2. Moist colors, whose chief ingredients are soft soap, mucilage, salicylic acid and glycerin, in about the proportions specified.

3. Moist colors, whose chief ingredients are soft soap, mucilage, salicylic acid, glycerin and mirbane-oil, in about the proportions specified.

AUGUST SARTORIUS.

Witnesses:
A. A. HOPKINS,
JOHN LOTKA.